2,967,163
RAIN REPELLENT COMPOSITION COMPRISING A STYRENATED OIL MODIFIED ALKYD RESIN WITH PARAFFIN WAX

Jacob M. Fain and Abraham Goldman, Brooklyn, N.Y., assignors, by mesne assignments, to the United States of America as represented by the Secretary of the Navy No Drawing. Filed Mar. 25, 1959, Ser. No. 801,976

1 Claim. (Cl. 260—22)

This invention relates to the treatment of material surfaces, particularly surfaces of transparent materials, in order to render them water-repellent and to maintain visibility therethrough under conditions of water drop application.

This application is a continuation-in-part of our application Serial No. 353,917, filed May 8, 1953, and now abandoned.

Accordingly the outstanding objects of the invention are to provide a material coating which tends to shed water in the form of drops which may be deposited thereon and which tends to break up drops, surface retained, into droplets of a size having reduced disturbance with visibility.

Additional objects are to provide a water repellent coating which will adhere strongly to, and be retained for a satisfactory time period on the base surface; which will be effective to maintain visibility in airplane use in heavy rains at speeds of 100 to 180 knots; which will not have adverse effects on the base or support materials associated therewith; which is effective both in masses and in thin film; which does not crystallize at variable temperatures; which may readily be applied by brush or spray; which may be packaged for ready use; and which may be prepared at low cost.

The use of water-repellent coatings on surfaces such as glass is well known, but, particularly in aircraft use where the glass is often moved at high speeds in heavy rain storms, the short life of the coatings quickly destroys their usefulness. In addition, for many of these coatings problems in crystallization, storage maintenance, clarity of light transmission, freedom of deleterious action on supporting structure and in application to the surface also exist.

In the present invention the objects stated are met by a composition containing a water-resistant film, a substance having high water shedding characteristics and a substance imparting substantial hardness to the film, with resultant long life.

Thus, the inventors have found that such a composition results from the combination of styrenated alkyd copolymer resin (generally available as a commercial product under various trade names), paraffin, a hardening or fortifying resin and a solvent. These styrenated alkyd copolymer resins can be made with varying proportions of alkyd and styrene as will be further explained below.

Alkyds are synthetic resins produced by the reaction of polybasic acids or anhydrides and polyhydric alcohols. The alkyd resins are usually reacted with one or more modifying agents to make them more compatible with drying oils or to impart special properties to the proetective coatings. These modifying agents include vegetable fatty acids or oils, rosin or rosin derivatives, natural resins, phenolics, ureas, melamines and unsaturated monomers. Commercial alkyd resins, broadly speaking, may be divided into three major groups depending on the type of organic acid or anhydride used in their products: (1) phthalic types, (2) maleic types, (3) sebacic acid and other aliphatic high molecular weight polybasic acid types.

In the manufacture of styrenated alkyd resins varying proportions of alkyd to styrene may be employed thus styrenated alkyd resins can be characterized as ranging in proportion from 91 parts alkyd to 9 parts styrene to 41 parts alkyd to 59 parts styrene. A method of manufacture is illustrated in the article on "Styrene Copolymers in Alkyd Resins," by Bhow and Payne, in Industrial and Engineering Chemistry, vol. 42, pp. 700 through 703. In this method styrenated alkyd resins were made by the reaction of styrenated dehydrated castor oil acids with phthalic anhydride and glycerine. The styrenated acids were made by adding 4 moles styrene to 1 mole dehydrated castor oil acids slowly over a 1.5 hour period and heating to a temperature of 293° F. (145° C.). The phthalic anhydride and glycerol were added to the styrenated fatty acids and heated to 430° F. in 30 minutes. The batch was held at 450° F. for 50 minutes. A stream of carbon dioxide was passed through the resins during the copolymerization reaction.

The above method produces an oxidizing type styrenated alkyd. Oxidizing type alkyds are understood to mean alkyd resins made with drying oils. It is possible to have long, medium, or short oil alkyds. This is a common terminology for these resins. Reference is made to the section on Alkyd Resins, p. 517, volume I, Encyclopedia of Chemical Technology, by R. E. Kirk and D. F. Othmer, published by The Interscience Encyclopedia Inc., N.Y.

Thus, in accord with the general formulation set forth above a number of satisfactory compositions have been produced among them being the following:

Example 1:

|  | Percentage by weight |
|---|---|
| Cycopol S–101–1 | 12.0 |
| Staybelite #10 | 4.0 |
| Paraffin | 0.3 |
| Sovasol #5 | 20.0 |
| Ethyl acetate | 63.7 |

Example 2:

| Cycopol S–101–1 | 12.0 |
|---|---|
| Staybelite #10 | 4.0 |
| Bakelite BR–9400 | 2.0 |
| Paraffin | 0.3 |
| Sovasol #5 | 20.0 |
| Ethyl acetate | 61.7 |

Example 3:

| Cycopol S–101–1 | 20.0 |
|---|---|
| Staybelite #10 | 4.0 |
| Piccolyte S–125 | 2.0 |
| Paraffin | 0.3 |
| Sovasol #5 | 20.0 |
| Toluene | 53.7 |

Example 4:

| Bakelite RJS–155 | 30.8 |
|---|---|
| Staybelite #10 | 2.0 |
| Paraffin | 0.3 |
| Velsicol 1A | 66.9 |

Example 5:

| Bakelite RJS–155 | 50.0 |
|---|---|
| Ester Gum 8L | 5.0 |
| Paraffin | 0.3 |
| Toluene | 44.7 |

Example 6:

| Cycopol S–101–1 | 50.0 |
|---|---|
| Lewisol 28 | 5.0 |
| Amberol ST–137 | 2.0 |
| Paraffin | 0.3 |
| Toluene | 42.7 |

Example 7:

| Cycopol S–101–1 | 12.0 |
|---|---|
| Staybelite #10 | 4.0 |
| Bakelite BR–254 | 2.0 |
| Piccolyte S–100 | 2.0 |
| Paraffin | 0.3 |
| Toluene | 79.7 |

| Example 8: | Percentage by weight |
|---|---|
| Cycopol S-101-1 | 12.0 |
| Staybelite #10 | 4.0 |
| Piccolyte S-100 | 2.0 |
| Amberol ST-137 | 2.0 |
| Paraffin | 0.3 |
| Toluene | 79.7 |

Example 9:
- Cycopol S-101-1 _____ 12.0
- Staybelite #10 _____ 4.0
- Piccolyte S-100 _____ 2.0
- Bakelite BR-254 _____ 4.0
- Paraffin _____ 0.3
- Toluene _____ 77.7

Example 10:
- Cycopol S-101-1 _____ 12.0
- Staybelite #10 _____ 4.0
- Piccolyte S-100 _____ 2.0
- Bakelite BR-254 _____ 4.0
- Paraffin _____ 0.3
- Toluene _____ 77.7

Example 11:
- Cycopol S-101-1 _____ 50.0
- Staybelite #10 _____ 4.0
- Piccolyte S-100 _____ 2.0
- Bakelite BR-254 _____ 2.0
- Paraffin _____ 0.3
- Toluene _____ 41.7

Example 12:
- Cycopol S-101-1 _____ 50.0
- Staybelite #10 _____ 4.0
- Piccolyte S-100 _____ 2.0
- Amberol ST-137 _____ 2.0
- Paraffin _____ 0.3
- Toluene _____ 41.7

Example 13:
- Cycopol S-101-1 _____ 50.0
- Staybelite #10 _____ 4.0
- Piccolyte S-100 _____ 2.0
- Amberol ST-137 _____ 4.0
- Paraffin _____ 0.3
- Toluene _____ 39.7

Example 14:
- Cycopol S-101-1 _____ 50.0
- Staybelite #10 _____ 4.0
- Piccolyte S-100 _____ 2.0
- Paraffin _____ 0.3
- Bakelite BR-254 _____ 4.0
- Toluene _____ 39.7

Example 15:
- Cycopol S-101-1 _____ 50.0
- Staybelite #10 _____ 4.0
- Piccolyte S-100 _____ 2.0
- Paraffin _____ 0.3
- Toluene _____ 43.7

Example 16:
- Cycopol S-101-1 _____ 50.0
- Cumar Resin V-2½ _____ 5.0
- Paraffin _____ 0.3
- Toluene _____ 44.7

Example 17:
- Cycopol S-101-1 _____ 50.0
- Pentalyn M _____ 5.0
- Paraffin _____ 0.3
- Toluene _____ 44.7

Example 18:
- Cycopol S-101-1 _____ 65.0
- Pentalyn M _____ 5.0
- Paraffin _____ 0.3
- Toluene _____ 20.0
- Butanol _____ 9.7

Example 19:
- Cycopol S-101-1 _____ 50.0
- Lewisol 28 _____ 5.0
- Paraffin _____ 0.3
- Toluene _____ 44.7

Example 20:
- Cycopol S-101-1 _____ 50.0
- Pentalyn M _____ 10.0
- Paraffin _____ 0.3
- Toluene _____ 39.7

Example 21:
- Bakelite RJS-155 _____ 50.0
- Pentalyn M _____ 5.0
- Paraffin _____ 0.3
- Toluene _____ 44.7

Example 22:
- Bakelite RJS-155 _____ 65.0
- Pentalyn M _____ 5.0
- Paraffin _____ 0.3
- Toluene _____ 29.7

Example 23:
- Cycopol S-101-1 _____ 65.0
- Pentalyn M _____ 6.5
- Paraffin _____ 0.3
- Toluene _____ 28.2

Example 24:
- Cycopol S-101-1 _____ 50.0
- Paraffin _____ 0.3
- Processed Congo #1052 _____ 10.0
- Toluene _____ 39.7

Example 25:
- Cycopol S-101-1 _____ 50.0
- Paraffin _____ 0.3
- Pentalyn K _____ 5.0
- Sovasol #5 _____ 20.0
- Toluene _____ 24.7

Example 26:
- Cycopol S-101-1 _____ 50.0
- Paraffin _____ 0.4
- Pentalyn M _____ 5.0
- Dibutyl phthalate _____ 0.5
- Toluene _____ 44.1

Example 27:
- Cycopol S-101-1 _____ 50.0
- Paraffin _____ 0.4
- Pentalyn M _____ 5.0
- Hi-Flash naphtha _____ 35.6
- Toluene _____ 9.0

Example 28:
- Cycopol S-101-1 _____ 25.00
- Paraffin _____ 0.15
- Pentalyn M _____ 2.50
- Toluene _____ 72.35

Example 29:
- Cycopol S-101-1 _____ 25.0
- Paraffin _____ 0.2
- Pentalyn K _____ 2.5
- Sovasol #2 _____ 72.3

Example 30:
- Cycopol S-101-1 _____ 25.0
- Paraffin _____ 0.4
- Pentalyn K _____ 2.5
- Sovasol #2 _____ 72.1

Example 31:
- Cycopol S-101-1 _____ 25.00
- Pentalyn K _____ 2.50
- Ethylene glycol dilaurate _____ 0.75
- Paraffin, 52° C _____ 0.15
- Toluene _____ 71.60

*Composition of trade name products employed*

Amberol ST-137—An unmodified phenol-formaldehyde resin.

Bakelite BR-254—An unmodified 100% para-phenyl-phenolic oil soluble resin.
Bakelite BR-9400—A phenolic resin.
Bakelite RJS-155—A styrene-alkyd copolymer, 65% solids in xylol.
Cumar Resin V-2½—A paracoumarone-indene resin of a specific color standard and with a softening range between 109° and 117° C.
Cycopol S-101-1—A styrene-alkyd copolymer resin in a solution of 50 percent solids in mineral spirits and having an air drying schedule as follows:

Dust free _____ minutes__ 15-30
Tack free _____ hours__ 1-2
Dry hard _____ do____ 3-4

Ester Gum 8L—A glycerol ester of rosin.
Lewisol 28—Maleic alkyd-modified rosin ester.
Pentalyn K—Pentaerythritol ester of modified rosin with a softening point (ball and ring method) of 172° C.
Pentalyn M—Phenolic-modified pentaerythritol ester of rosin with a softening point (ball and ring method) of 152° C.
Piccolyte S-100—A hydrocarbon terpene resin with a melt point of 100° C.
Piccolyte S-125—A hydrocarbon terpene resin with a melt point of 125° C.
Processed Congo #1052—A natural Congo copal resin which has been treated to give a low acid number (30-35), a high melt point (140-150° C.) and a heavy viscosity (L-P in 50% xylol).
Sovasol #2—A grade of mineral spirits with a distillation range of 150° F. to 191° F.
Sovasol #5—A grade of mineral spirits with a flash point above 100° F.
Staybelite #10—Glycerin ester of hydrogenated rosin.
Velsicol 1A—A toluene substitute boiling at about 235° C.

In each of the above examples the resulting solutions air dry rapidly without baking to form a tough film of high optical clarity. The drying properties of the styrenated alkyd resin employed fall within the following limits when the styrenated alkyd resin is in a 50 percent solution in petroleum spirits:

Dust free _____ minutes__ 15-30
Tack free _____ hours__ 1-2
Dry hard _____ do____ 3-4

In order to make an air drying styrenated alkyd copolymer resin it is usual and preferable to modify the alkyd resin by the addition of an unsaturated oxidizing vegetable or animal oil or acid such as linseed, dehydrated castor oil, soybean oil, tung oil, oiticica oil, perilla oil, fish oil, and tall oil. The copolymerization reaction by which a styrenated alkyd resin is produced which is employed by the inventors differs from that disclosed in the Bhow and Payne article in that the inventors oil modify the alkyd and then introduce styrene therein to produce the styrenated alkyd (oxidizing type).

Typically the commercial preparation of any given styrenated alkyd resin consists of a solution of the resin in mineral spirits (or petroleum spirits), toluene or xylene. The percentage limitation of styrenated alkyd resin to solvent is not critical. Thus, various commercial solutions have been employed in the production of successful compositions in which the solutions have contained 50, 60, or 65 percent solids. The viscosities of the solutions are an important reason for the product concentrations in which they are supplied commercially but for the purpose of this invention practically any concentration above 25 percent solids can be used.

The beneficial function contributed by paraffin to the composition is unique and productive of startling results. A large number of experiments were carried out by the inventors using different waxes but none of them yielded the water repellancy required except paraffin. Not only could paraffin be incorporated with the styrenated alkyd resin to give a rain repellant film of satisfactory durability but such a film also possesses optical clarity. It has been determined that paraffin in combination with the styrenated alkyd resin produces a film which has a higher contact angle with water. As a result thereof normal water drops are degraded to small droplets which are more readily shedded.

With regard to the beneficial effects of paraffin, the composition and rain spray resistance of certain formulations follow below:

| | Composition (Percentage by Weight) | Rain Spray Test (Film Brush-Applied to Glass) |
|---|---|---|
| Example 32: | | |
| Cycopol S-101-1 | 12.0 | |
| Staybelite #10 | 4.0 | Wets immediately. |
| Sovasol #5 | 20.0 | |
| Ethyl Acetate | 64.0 | |
| Example 33: | | |
| Cycopol S-101-1 | 12.0 | |
| Staybelite #10 | 4.0 | |
| Paraffin | 0.3 | 5% wetting in 3½ hours. |
| Sovasol #5 | 20.0 | |
| Ethyl Acetate | 63.7 | |
| Example 34: | | |
| Cycopol S-101-1 | 12.0 | |
| Staybelite #10 | 4.0 | |
| Piccolyte S-100 | 2.0 | Fails immediately. |
| Naphthalene | 0.5 | |
| Sovasol #5 | 20.0 | |
| Ethyl Acetate | 61.5 | |
| Example 35: | | |
| Cycopol S-101-1 | 12.0 | |
| Staybelite #10 | 4.0 | |
| Piccolyte S-100 | 2.0 | Do. |
| Anthracene | 0.5 | |
| Sovasol #5 | 20.0 | |
| Ethyl Acetate | 61.5 | |
| Example 36: | | |
| Cycopol S-101-1 | 25.0 | |
| Pentalyn K | 2.5 | Do. |
| Ethylene Glycol Dilaurate | 1.5 | |
| Toluene | 71.0 | |
| Example 37: | | |
| Cycopol S-101-1 | 25.00 | |
| Pentalyn K | 2.50 | Do. |
| Ethylene Glycol Dilaurate | 0.75 | |
| Toluene | 71.75 | |
| Example 38: | | |
| Cycopol S-101-1 | 25.00 | |
| Pentalyn K | 2.50 | |
| Ethylene Glycol Dilaurate | 0.75 | Fails in 6 hours. |
| Paraffin 52° C | 0.15 | |
| Toluene | 71.60 | |
| Example 39: | | |
| Cycopol S-101-1 | 25.00 | |
| Paraffin 52° C | 0.15 | Fails in 4 hours. |
| Cumar V-2½ | 2.50 | |
| Toluene | 72.35 | |
| Example 40: | | |
| Cycopol S-101-1 | 25.0 | |
| Cumar V-2½ | 2.5 | Fails immediately. |
| Toluene | 72.5 | |

In contrast to the above, the compositions of Examples 17 and 28 which are preferred yield a time of 6 hours to the 5 percent wetting point. When the film is deposited on Plexiglas the results are even better.

In order to impart increased hardness to the film a hardening or fortifying agent is advantageously employed. Such a hardening agent can be made by choosing one from the following group: pentaerythritol ester of rosin, glycerol rosin ester, ethylene glycol rosin ester, diethylene rosin ester, coumarone-indene resin and phenolformaldehyde resin and then modifying the chosen ester or resin. Modification of the particular ester or resin can be accomplished by using either the condensate of the phenol and formaldehyde or the reaction product of maleic anhydride and penaterythritol. The addition of any one of the above modified resins or rosin esters has been demonstrated as increasing the life of the film and improving the adheribility of the film.

In the manufacture of a film hardener such as phenolic-modified pentaerythritol ester of rosin, the phenolic resin is added as such to the kettle containing the reaction product of the rosin and the pentaerythritol. In the preparation of the maleic alkyd modification of the rosin esters a frequent procedure is to form an adduct by reacting maleic anhydride with rosin and subsequently esterifying with glycerol or pentaerythritol.

The described composition forms a liquid which may be stored ready for use; or it may be held in such form that, by simple mixing, it may be made ready for application. Application to the desired surfaces may be by spray, brush or other suitable means. On solidifying, the film is clear and hard, and non-injurious to supporting structural substances such as aluminum, aluminum alloys, steel, finishes (as enamels, lacquers, etc.), glass and plastic materials, as determined by heating the applied composition for seven days at 100° F. The composition may be deposited in thicker masses or strata or in thin films as it exhibits its useful properties in both forms. Under temperature variation of −25° F. to 170° F. no crystallization takes place. The adherence to the base surface is strong.

Tests have indicated efficient use over markedly increased time periods. For example, a film of the composition applied to Plexiglas, a plastic material, and subjected to action of a rain spray machine built according to Army-Navy aeronautical specifications, was found to maintain visibility requirements for seven hours before surface wetting of five percent occurred. When the film was applied to glass the time on visibility was six hours to the five percent wetting point. This compares with a time of three hours on Plexiglas and two and one-half hours on glass for a similar wetting point in the case of the composition now in current military use. Obviously, test machine use is equivalent to extremely unusual and adverse conditions. For usual intermittent use the life of the film may readily be extended to ten hours or more, depending on the amount of rain encountered and the speed of the aircraft.

The composition in preferred proportions has been described. However, the stated parts may be varied in the following ranges:

|  | Parts by weight |
|---|---|
| Styrenated-alkyd resin (dry basis) | 7.5–25.0 |
| Paraffin | 0.1–0.3 |
| Film hardener | 2.0–5.0 |
| Toluol | 90.4–69.7 |

A critical limitation involved is that the ratio of paraffin to solid resin content should be between 1 to 83 and 1 to 150. A limitation also is that the film hardener (e.g. pentaerythritol ester of rosin) should range between 15 and 25 percent of the solids content. The essential ingredients bearing on rain repulsion and water shedding are the styrenated-alkyd resin combined with paraffin, the liquids facilitating application and the supplementary fortified resins increasing the effective life of the dried film.

In order to choose a styrenated-alkyd resin suitable for the practice of this invention the only necessary criteria are that (1) the ratio of alkyd to styrene shall range from 91:9 to 41:59, (2) the styrenated-alkyd resin shall have a drying time in air between the limits previously described or must be capable of being modified to fall between these drying time limits by the use of the specific modifying agents enumerated above. For specific objects it is of prime import that the styrenated alkyd (modified or unmodified) shall dry in an optically clear film. Thus, having selected an acceptable styrenated alkyd in this manner the combination of such styrenated alkyd with paraffin, one or more of the specified film hardeners and the specified resin solvent will perforce result in a satisfactory composition. Thus, a check of drying time, a routine operation, is the only testing step required of one wishing to practice this invention.

Obviously many modifications and variations of the present invention are possible in the light of the above teachings. It is therefore to be understood that within the scope of the appended claim the invention may be practiced otherwise than as specifically described.

What is claimed is:

An optically transparent water-repellant composition which dries hard in about four hours consisting of about 7.5 to about 25.0 parts by weight of a phthalic anhydride-glycerol alkyd modified with styrenated castor oil acids, about 0.1 to about 0.3 part by weight of paraffin wax, about 2.0 to about 5.0 parts by weight of a film hardener and about 90.4 to about 69.7 parts by weight of a solvent wherein the ratio of paraffin to solid resin content is between 1 to 83 and 1 to 150, the film hardener is from 15–25 percent of the solids content, and the ratio of alkyd to styrene is between 91 to 9 and 41 to 59.

References Cited in the file of this patent

UNITED STATES PATENTS

| 2,640,038 | Wilder et al. | May 26, 1953 |
| 2,802,797 | Lerch | Aug. 13, 1957 |
| 2,872,422 | Rolk et al. | Feb. 3, 1959 |